United States Patent [19]

Min

[11] Patent Number: 5,581,393
[45] Date of Patent: Dec. 3, 1996

[54] MIRROR ARRAY AND METHOD FOR THE MANUFACTURE THEREOF

[75] Inventor: Yong-Ki Min, Seoul, Rep. of Korea

[73] Assignee: Daewoo Electronics Co., Ltd., Seoul, Rep. of Korea

[21] Appl. No.: 216,755

[22] Filed: Mar. 23, 1994

[30] Foreign Application Priority Data

Mar. 23, 1993 [KR] Rep. of Korea .................. 93-4519
Mar. 23, 1993 [KR] Rep. of Korea .................. 93-4520

[51] Int. Cl.⁶ .................................................. G02B 26/08
[52] U.S. Cl. .................... 359/223; 359/224; 359/291; 359/850
[58] Field of Search ............................... 359/223, 224, 359/214, 291, 846, 849, 850, 900

[56] References Cited

U.S. PATENT DOCUMENTS

| | | | |
|---|---|---|---|
| 3,746,911 | 7/1973 | Nathanson et al. | 348/771 |
| 3,886,310 | 5/1975 | Guldberg et al. | 348/771 |
| 4,592,628 | 6/1986 | Altman et al. | 359/223 |
| 5,212,582 | 5/1993 | Nelson | 359/224 |

*Primary Examiner*—Paul M. Dzierzynski
*Assistant Examiner*—Darren E. Schuberg
*Attorney, Agent, or Firm*—Anderson Kill Olick P.C.

[57] ABSTRACT

A photoresist is deposited on a glass substrate for forming a separation layer. Then, an array of reflectors is generated on the separation layer; followed by a supporting layer thereon, which is made of a self-adhesive epoxy. Thereafter, an actuator array is bonded on the supporting layer. The separation layer is then removed to disengage the glass substrate. The mirror array formation is finalized by patterning the separation layer. Consequently, the above inventive process allows the fabrication of a mirror array in a simple manner without having to employ the electroplating process.

14 Claims, 4 Drawing Sheets

MIRROR ARRAY AND METHOD FOR THE MANUFACTURE THEREOF

FIELD OF THE INVENTION

This invention relates to a video display system; and, in particular, to an improved mirror array for use with an optical projection system and its manufacturing method.

Description of the Prior Art

Among the various video display systems available in the art, an optical projection system is known to be capable of providing high quality displays in a large scale. In such an optical projection system, light from a lamp is uniformly illuminated onto, e.g., an array of M×N mirrors. The array of M×N mirrors is mounted on an array of actuators which includes a corresponding number, i.e., M×N, of actuators such that each of the mirrors is coupled with each of the actuators. The actuators are made of an electrodisplacive material such as piezoelectric or electrostrictive material which deforms in response to an electrical signal applied thereto.

The reflected light beam from each of the mirrors is incident upon an aperture of a baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as projection lens, thereby displaying an image thereon.

In FIGS. 1A to 1F, one of the conventional mirror array fabrication processing sequences is illustrated. First, as shown in FIG. 1A, a separation layer 3 is formed on a flat substrate. The formation of the separation layer is carried out by the spin-coating of a photoresist. Then, a first metal layer 5 is deposited on the separation layer 3 by, e.g., sputtering. The first metal layer 5 is for reflecting incident light beams and is made of a metal with a high reflectivity, e.g., Al. Subsequently, a second and a third metal layers 6 and 7 are applied on the first metal layer 5 by using a similar technique used in forming the first layer 5. The second metal layer 6 functions as an intermediate layer for conferring good adhesivity between the first metal layer 5 and the third metal layer 7. Cu and Ni are commonly used for the second metal layer 6 and the third metal layer 7, respectively.

Next, the metal layers 5,6 and 7 are patterned into a mirror array structure by employing a conventional photolithography process (FIG. 1B). In the following step as shown in FIG. 1C, a photoresist layer 11 which is composed of the same photoresist used in the separation layer 3 is applied onto the structure treated in FIGS. 1A to 1B and subsequently defined for exposing the top surface of the third metal layer 7. The exposed surface acts as a seed in the following electroplating process.

Thereafter, electroplating of the same metal used in the third metal layer 7 is carried out, and an electroplated fourth metal layer 13 is formed, as shown in FIG. 1D, on the surface of the third metal layer 7 which is not covered by the photoresist layer 11. An actuator array 15 is then bonded onto the surface of the fourth metal layer 13 such that each of the actuators 17 in the actuator array 15 is aligned with each of the mirrors in the mirror array structure as shown in FIG. 1E, said each of the mirrors comprising the metal layers 5,6,7 and 13.

The photoresist layer 11 is then removed with the separation layer 3 concurrently, thereby disengaging the substrate 1; and the formation of the mirror array is finalized as shown in FIG. 1F. The fourth metal layer 13 serves as a supporting layer for preventing the first metal layer 5, which has a substantially larger surface area than that of the actuator, from sagging; and, therefore, the formation of the fourth metal layer 13 is carried out by using an electroplating technique which can provide a sufficient thickness for such purpose.

As explained above, the prior art method for the manufacture of a mirror array involves a series of cumbersome and complicated processes for fabricating a multiplicity of metallic layers.

SUMMARY OF THE INVENTION

It is, therefore, an object of the invention to provide an array of mirrors and a manufacturing method thereof, which requires no electroplating process and employs a self-adhesive epoxy as a supporting layer for the mirrors to thereby substantially simplify the overall manufacturing process.

In accordance with the present invention, there is provided a method for fabricating an array of mirrors on the top surface of an array of actuators for use with an optical projection system, wherein the array of actuators is composed of a multiple number of equal-sized actuators, each actuator being made of an electrodisplacive material which deforms in response to an electrical signal applied thereto; the array of mirrors is composed of said multiple number of mirrors of an identical size, each of the mirrors including a reflector having a flat surface for reflecting a light incident thereon in accordance with said deformation of each of the actuators coupled thereto to thereby modulate the optical path of the reflected light and a supporting member for sustaining the flatness of the reflector incorporated therewith; and further the top surface of each of the mirrors is substantially larger than that of each of the actuators, said method comprising the steps of:

(a) forming a separation layer on a substrate;

(b) depositing a reflection layer on the separation layer;

(c) defining the reflection layer into an array of reflectors;

(d) providing a supporting layer on the substrate treated in accordance with said steps (a) to (c) above;

(e) bonding the array of actuators onto the supporting layer such that each of the actuators is aligned with each of the reflectors defined in step (c);

(f) removing the separation layer, to thereby disengage the substrate from the supporting layer and the array of reflectors; and (g) patterning the supporting layer into a plurality of disjointed supporting members in said multiple number, each of the members being commensurate with each of the reflectors, thereby providing the array of mirrors mounted on the array of actuators.

BRIEF DESCRIPTION OF THE DRAWINGS

The present invention together with its objects and advantages will become more apparent from the following description of preferred embodiments given in conjunction with the accompanying drawings, wherein like reference numbers used in FIGS. 2 and 3 represent like parts.

FIGS., 1A to 1F depict schematic cross-sectional views illustrating a prior art processing sequence for mirror array formation.

DETAILED DESCRIPTION OF THE PREFERRED EMBODIMENTS

Referring now to FIGS. 2 and 3, there are provided processes for fabricating a mirror array incorporated with an actuator array without having to employ an electroplating process in accordance with the preferred embodiments of the present invention.

Figure 1A:
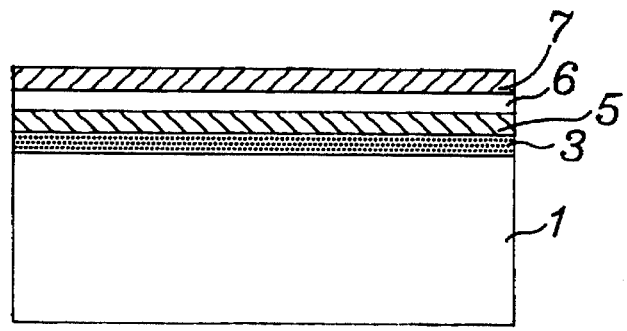
Figure 1B:
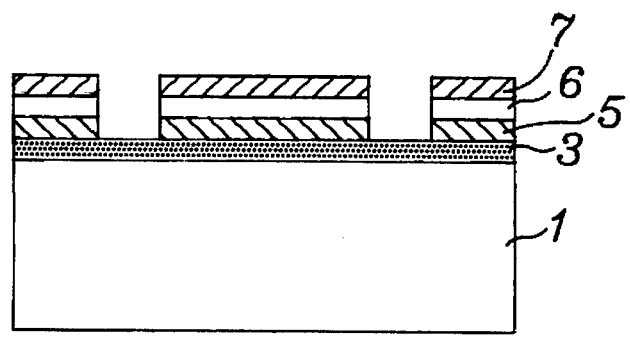
Figure 1C:
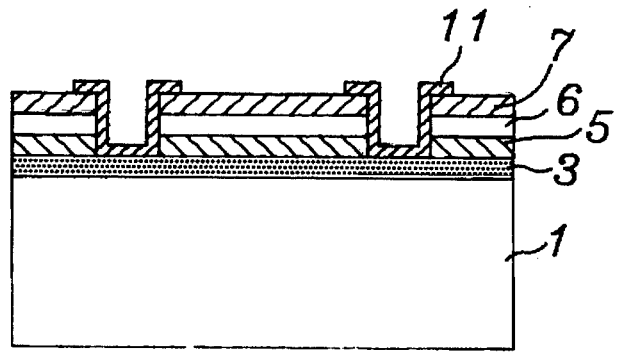
Figure 1D:
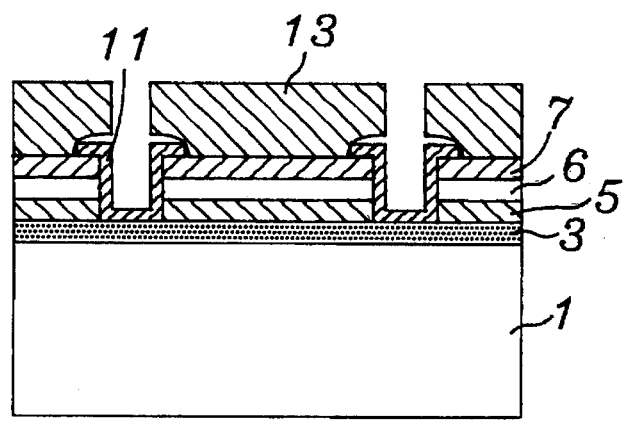
Figure 1E:
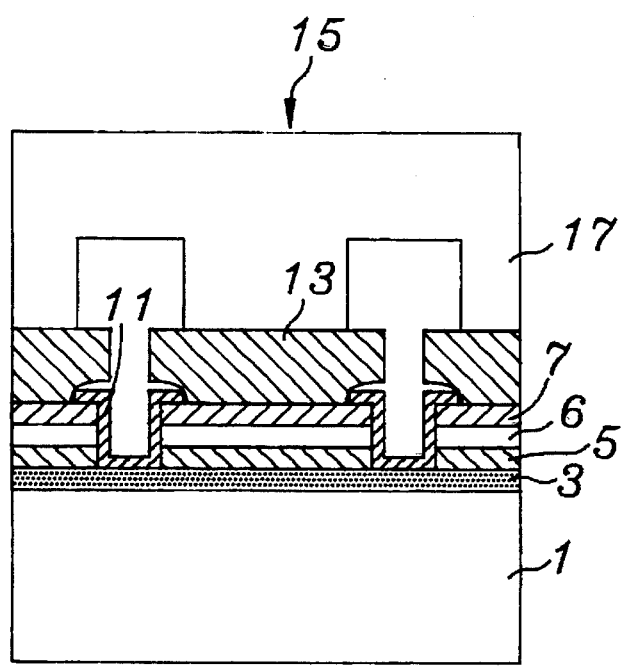
Figure 1F:
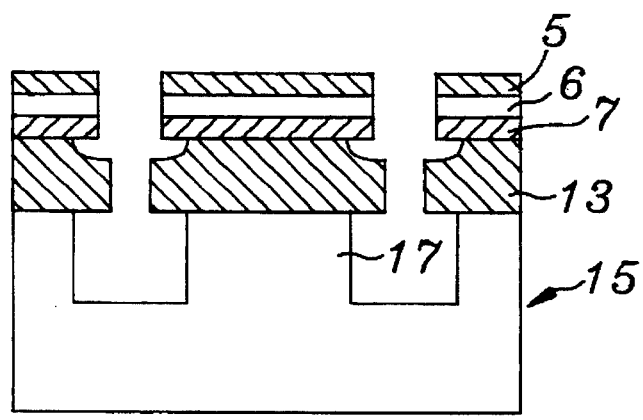
Figure 2A:
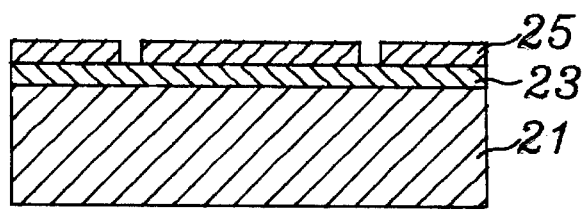
FIGS. 2A to 2C represent schematic cross-sectional views describing the processing sequence in accordance with a preferred embodiment of the present invention.

As shown in FIG. 2A, a separation layer 23 is provided on a substrate 21 having a flat surface. The separation layer 23 is formed by spin-coating a photoresist; and the substrate 21 is preferably made of a chemically resistant glass for multiple usages. In the next step, a reflection layer is deposited on the separation layer 23 and is patterned by using a conventional photolithography process into a plurality of segments to form an array of disjointed, e.g., M×N, reflectors 25 as shown in FIG. 2A.

A gap which separates adjacent reflectors is defined to have a minimal width in order to maximize the reflective surface area for each of the reflectors 25 to thereby increase the optical efficiency thereof. The reflection layer is preferably made of a metallic material having a high reflectivity such as Al. When Al is used for the reflection layer, a sputtering or thermal evaporation technique can be employed for the deposition thereof.

Figure 2B:
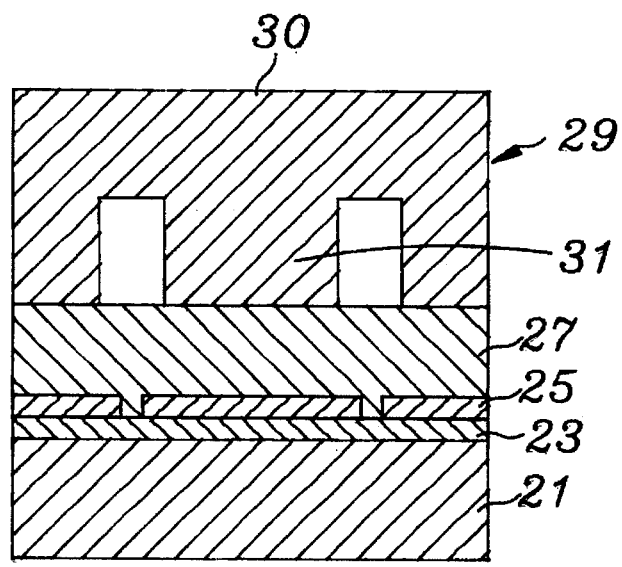

Thereafter, as shown in FIG. 2B, a self-adhesive epoxy is applied on the entire surface of the structure treated as shown in FIG. 2A by using a spin-coating or screen printing technique to form a supporting layer 27. The preferred thickness of the supporting layer lies within a range from 10 to 30 μm. An actuator array 29 is then bonded directly onto the supporting layer 27 without having to employ any bonding agent therebetween, wherein the actuator array 29, which has an identical array structure as in the reflector array, comprises a same number, e.g., M×N, of actuators 31; and a base 30 for holding the actuators in position thereon and providing electrical signals to the actuators. The actuators are made of an electrodisplacive material such as piezoelectric or electrostrictive material which deforms in response to electrical signals applied via electrodes coupled thereto; and the top surface area of each of the actuators 31 is normally substantially smaller than the reflective surface area of each of the reflectors 25. Bonding of the actuator array 29 is carried out in such a manner that each of the actuators 31 is aligned with each of the reflectors 25.

Figure 2C:
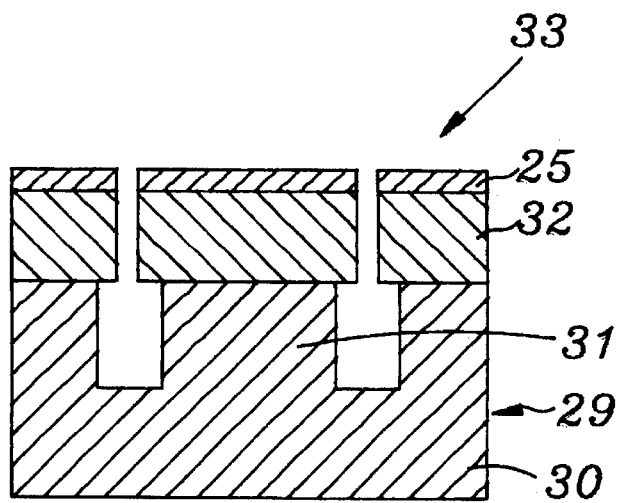

In the subsequent step, the separation layer 23 is removed by an appropriate dissolving agent to thereby disengage the substrate 21 from the structure treated as shown in FIG. 2B; followed by the defining of the supporting layer 27 into a plurality of segmented supporting members 32 as shown in FIG. 2C such that the supporting members retain a pattern identical to that of the reflectors 25. The definition of the supporting members 32 can be carried out by either a laser trimming or a dry etching scheme such as reactive ion etching or plasma etching. FIG. 2C illustrates the mirror array fabricated on the top surface of the actuator array 29, wherein the mirror array is composed of the plurality of mirrors 33, each of the mirrors comprising the supporting member 32 and the reflector 25; and each of the mirrors 33 is coupled with each of the actuators 31 in the actuator array 29.

It should be appreciated that the formation of the reflectors 25 or the supporting members 32 can be performed during other processing steps than the steps specified hereinabove: for instance, the supporting layer 27 may be patterned into the supporting members 32 prior to the step for bonding the actuator array 29, or the formation of the reflectors 25 and the supporting members 32 can be performed concurrently either just prior to the step of bonding the actuator array 29 or after the step of removing the separation layer 23.

Further, it should be noted that the supporting layer 27 is preferably made to be electrically non-conductive in case the actuator 31 has such electrode configuration that both the reference and biasing electrodes appear on the top surface thereof.

Figure 3A:
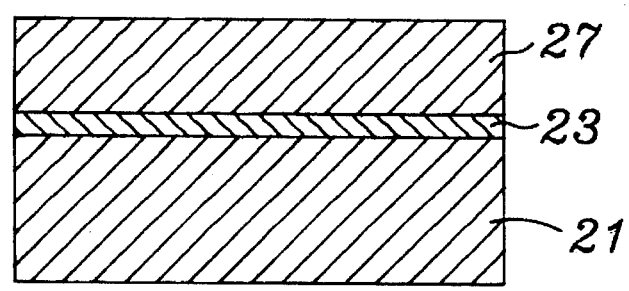
FIGS. 3A to 3C provide schematic cross-sectional views showing the processing sequence in accordance with another preferred embodiment of the present invention.
Figure 3B:
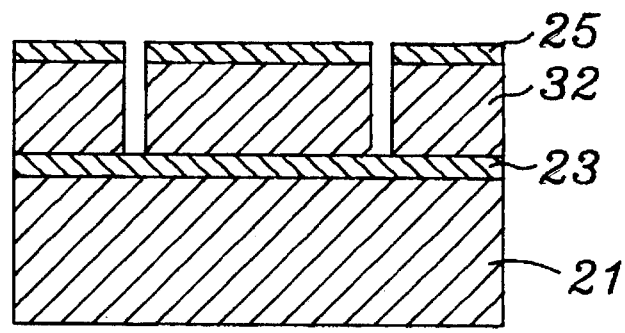
Figure 3C:
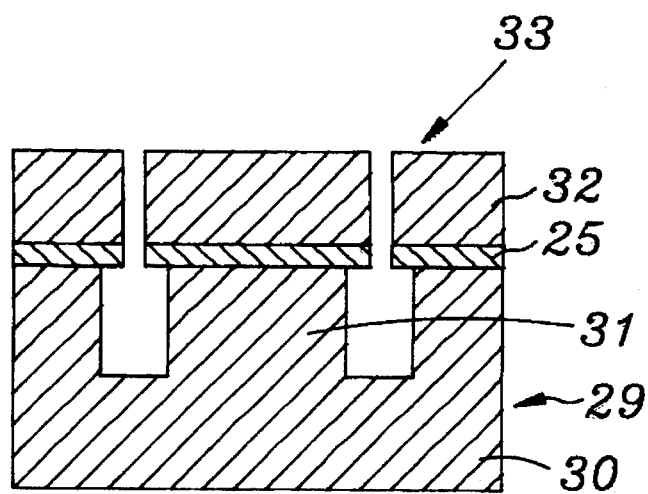

Referring to FIGS. 3A to 3C, there is provided a mirror array manufacturing process in accordance with another embodiment of the present invention. In this process, a separation layer 23 is formed first on a substrate 21; followed by a supporting layer 27 as shown in FIG. 3A. Thereafter, a reflection layer is deposited on the supporting layer 27 and, subsequently, the reflection layer and the supporting layer 27 are defined into arrays of segmented reflectors 25 and supporting members 32, respectively, as shown in FIG. 3B.

In the next step as shown in FIG. 3C, an actuator array 29 is mounted on the reflector array by using a bonding agent therebetween and the processing ends with removing the separation layer 23 to disengage the substrate 21. The bonding agent should be electrically non-conductive in case the actuator 31 has such electrode configuration that both the reference and biasing electrodes appear on the top surface thereof.

It should be noted that the formation of the reflectors 25 and the supporting members 32 can be performed after the step of removing the separation layer 23 rather than prior to the step of mounting the actuator array 29.

It should also be understood that the supporting layer 27 in FIG. 3 need not be a self-adhesive epoxy, although it is required to be transparent to the visible lights.

While the present invention has been described with respect to certain preferred embodiments only, other modifications and variations may be made without departing from the scope of the present invention as set forth in the following claims.

What is claimed is:

1. A method for fabricating an array of mirrors on the top surface of an array of actuators for use with an optical projection system, wherein the array of actuators is composed of M×N equal-sized actuators, M and N being integers, each of the actuators deforming in response to an electrical signal applied thereto; the array of mirrors is composed of M×N mirrors of an identical size, each of the mirrors including a reflector having a flat surface for reflecting a light incident thereon in accordance with said deformation of each of the actuators coupled thereto to thereby modulate the optical path of the reflected light, and a supporting member for sustaining the flatness of the reflector incorporated therewith; and the top surface of each of the mirrors is substantially larger than that of each of the actuators, said method comprising the steps of:

(a) forming a separation layer on a substrate;

(b) depositing a reflection layer on the separation layer;

(c) defining the reflection layer into an array of reflectors;

(d) providing a supporting layer made of a self-adhesive epoxy on the substrate treated in accordance with said steps (a) to (c) above;

(e) bonding the array of actuators onto the supporting layer such that each of the actuators is aligned with each of the reflectors defined in step (c);

(f) removing the separation layer to thereby disengage the substrate from the supporting layer and the array of reflectors; and (g) patterning the supporting layer into M×N disjointed supporting members, each of the members being commensurate with each of the reflectors, thereby allowing the array of mirrors mounted on the array of actuators.

2. The method according to claim 1, wherein said step (g) precedes said step (e) of bonding the actuator array.

3. The method according to claim 1, wherein said step (c) of defining the reflection layer and said step (g) of patterning the supporting layer are carried out concurrently prior to said step (e) of bonding the actuator array.

4. The method according to claim 1, wherein said step (c) of defining the reflection layer is performed concurrently with said step (g) of patterning the supporting layer after said step (f) of removing the separation layer.

5. The method according to claim 1,2,3 or 4 wherein said reflection layer is made of a metallic material.

6. The method according to claim 5, wherein said metallic material is Al.

7. The method according to claim 6, wherein said separation layer is made of a photoresist.

8. The method according to claim 7, wherein said substrate is made of a glass.

9. An array of mirrors for use with an array of actuators in an optical projection system, wherein the array of actuators is composed of M×N equal-size actuators, M and N being integers each of the actuators deforming in response to an electrical signal applied thereto; the array of mirrors is composed of M×N mirrors of an identical size; and the top surface of each of the mirrors is substantially larger than that of each of the actuators, whereas said mirrors do not touch or overlap each other, each of the mirrors comprising:

a reflector having a flat surface for reflecting a light incident thereon in accordance with the deformation of the actuator coupled thereto to thereby modulate the optical path of the reflected light; and a supporting member for sustaining the flatness of said reflector, said member being made of a self-adhesive epoxy and positioned between said reflector and the top surface of the actuator, and the top surface area of the supporting member being substantially identical to that of the reflector.

10. The array according to claim 9, wherein said reflector is made of a metallic material.

11. The array according to claim 10, wherein said metallic material is Al.

12. An array of mirrors for use with an array of actuators in an optical projection system, wherein the array of actuators is composed of M×N equal-sized actuators, M and N being integers, each of the actuators deforming in response to an electrical signal applied thereto; the array of mirrors is composed of M×N mirrors of an identical size; and the top surface of each of the mirrors is substantially larger than that of each of the actuators, whereas said mirrors do not touch or overlap each other, each of the mirrors comprising:

a reflector, mounted on the top surface of each of the actuators, having a flat surface for reflecting a light incident thereon in accordance with the deformation of the actuator coupled thereto to thereby modulate the optical path of the reflected light; and a supporting member made of a self-adhesive epoxy, disposed on the flat surface of the reflector for sustaining the flatness of said reflector, said member being transparent to the visible lights and the top surface area of the supporting member being substantially identical to that of the reflector.

13. The array according to claim 12, wherein said reflector is made of a metallic material.

14. The array according to claim 13, wherein said metallic material is Al.

\* \* \* \* \*